United States Patent [19]

Robertson

[11] Patent Number: 4,457,845
[45] Date of Patent: Jul. 3, 1984

[54] RECOVERY OF PHOSPHORUS FROM SLUDGE

[75] Inventor: James A. Robertson, Levittown, Pa.

[73] Assignee: FMC Corporation, Philadelphia, Pa.

[21] Appl. No.: 407,012

[22] Filed: Aug. 11, 1982

[51] Int. Cl.$^3$ .............................................. B01C 13/00
[52] U.S. Cl. .................................. 210/651; 210/907; 210/DIG. 5
[58] Field of Search ................ 210/907, DIG. 5, 906, 210/649, 650, 651; 423/322; 204/90, 149

[56] References Cited

U.S. PATENT DOCUMENTS

| | | | |
|---|---|---|---|
| 3,617,548 | 11/1971 | Willihnganz | 210/DIG. 5 |
| 3,684,461 | 8/1972 | Müller et al. | 23/293 |
| 4,094,669 | 6/1978 | Balko et al. | 75/108 |

OTHER PUBLICATIONS

Redmon, D. C., "Cartridge Type Coalescers", *Chemical Engineering Progress*, 59, (9), pp. 87–90.

*Primary Examiner*—Frank A. Spear, Jr.
*Attorney, Agent, or Firm*—Richard E. Elden; Eugene G. Horsky

[57] ABSTRACT

Phosphorus is recovered from the phosphorus sludge formed in the electrothermal production of phosphorus by contacting the sludge with a hydrophobic surface with sufficient force to cause the droplets of phosphorus in the sludge to coalesce and accumulate on the surface, from which it can become detached in the form of large phosphorus drops. One such recovery process involves contacting the sludge, under hydrostatic or other pressure, with a porous membrane formed of a hydrophobic material, through which passes coalesced phosphorus from the sludge, the water and the bulk of the impurities of the sludge being restrained against passage. Other coalescing procedures involve shearing the sludge between sliding hydrophobic surfaces and passing the sludge between hydrophobic surfaces in rolling contact. Typical hydrophobic materials are polyethylene, polypropylene, and rubber.

27 Claims, No Drawings

RECOVERY OF PHOSPHORUS FROM SLUDGE

This invention relates to the recovery of elemental phosphorus from the sludge produced in the electrothermal process.

In the electrothermal process for phosphorus, finely divided impurities become trapped on and within the droplets formed during condensation of phosphorus vapor. These impurities include reaction intermediates and by-products from the furnace, as well as coke, silica, and shale dusts carried out of the furnace by the carbon monoxide stream. These impurities are usually about 1 μm in diameter and contribute to the formation and stabilization of an objectionable sludge which sometimes represents a large proportion of the production of a phosphorus plant. This sludge must frequently be reprocessed by the plant before it can be burned in a phosphorus-burning plant, and therefore, it represents an added cost factor.

Attempts to recover phosphorus from sludges of this sort are reviewed in U.S. Pat. No. 3,684,461 by Muller et al. Processes suggested by the prior art are found by Muller et al to be inappropriate for use in a large commercial phosphorus plant; instead, a process is taught in which the sludge is dewatered, dried, distilled, and condensed. This multistep process requires a large investment for the equipment and is a labor-intensive process which, because of the variable nature of phosphorus sludge, requires constant operator attention to control the process.

Phosphorus sludge appears as a layer between the pool of consolidated phosphorus and the phossy water above. At temperatures above the melting point of phosphorus the sludge consists of two liquid phases, phosphorus and water, several solid phases, and when fresh, a gas phase as well.

The phosphorus sludge is variable in composition; it appears to be a coarse emulsion in which the phosphorus is usually the dispersed phase and the water the dispersing medium. In fresh sludge, some solids are dispersed within the droplets of the phosphorus; but on aging, these solids migrate to the surface of the drops leaving the interior of the droplet clean. Microscopic examination of droplets of phosphorus in aged sludge indicates that very clean, particle-free phosphorus can be withdrawn from the interior of the aged droplets.

Although the practice of this invention does not depend on any particular theory of operation, it is convenient for the description of the process to consider the phosphorus droplets in the sludge to be surrounded by a sack or skin which is reinforced by the solids originally in the phosphorus. This model can be duplicated in part in the laboratory from clean phosphorus under water which is contacted with oxygen by sparging with air. When clean phosphorus is dispersed in oxygen-free water, the coarse droplets form perfect spheres which coalesce on contact; when dispersed in water-containing oxygen, the time of coalescence increases the longer the particles contact the oxygen-containing water. Eventually, a fairly stable sludge can be produced which is yellow in color. Clean, colorless phosphorus can be drawn from the interior of these droplets leaving behind a collapsing sack or skin which becomes dark orange as it consolidates. Droplets surrounded by this skin have little tendency to form spheres and can be distorted into tubular and other irregular shapes such as observed in a granulated plant sludge. The appearance of the yellow-orange skin and its response to stress indicates that it is a solid film.

It has been found that the phosphorus contained in droplets of sludge can be recovered by contacting the sludge with a hydrophobic surface with sufficient force so that the surface is wet by the phosphorus, thus coalescing the phosphorus droplets. For the purpose of this invention, a hydrophobic surface is one which is preferably wet by elemental phosphorus rather than by water. Non-limiting examples of such surfaces include hydrocarbons, such as greased surfaces and polymers including polystyrene, polyethylene, polypropylene, and rubber. Surfaces of hydrophobic materials which are coated with oxides or other polar compounds, which increase the tendency for wetting by water, must obviously be cleaned or conditioned to be a hydrophobic surface. This cleaning or conditioning may be done by scraping or cutting the surface to expose a fresh surface. Surfaces, such as aluminum or ceramic materials which are wet preferably by water rather than by elemental phosphorus, are not hydrophobic surfaces for the purpose of this invention.

Mere contact of a hydrophobic surface with the sludge is insufficient to cause the phosphorus droplets in the sludge to wet the surface; instead, a force is required. This force is explained in the suggested model as the shearing force required to rupture the film surrounding the phosphorus droplet and express the elemental phosphorus therefrom. This force will vary substantially according to the strength of the film, and therefore, by the history of the droplet. However, the force required can easily be determined by experiment.

Once the surface is wet with phosphorus, additional droplets are contacted and coalesced onto the surface to form relatively large drops. These large drops on the surface continue to grow until the force holding them on the surface is exceeded by the force of gravity or the shearing force, which initially caused the coalescence, and large drops detach which can then be recovered from the sludge by conventional means, such as settling or centrifuging.

In one particular preferred embodiment of the present process, the sludge is subjected to shearing forces in a rod mill, the rods having hydrophobic surfaces. The rods become wet with the phosphorus until a sufficient accumulation builds up whereupon the shearing forces within the rod mill detach large drops of phosphorus which can be separated from the sludge by a conventional centrifuge.

In another preferred embodiment the sludge flows past a porous hydrophobic barrier. The flow and static head differential across the barrier provides the shearing force required, permitting the phosphorus to wet the membrane. The static pressure on the sludge, on the proximal side of the barrier, is maintained sufficiently higher than the pressure on the distal side of the barrier so that the phosphorus passes through the openings or pores of the barrier and detaches as drops which coalesce as a pool of clean, consolidated phosphorus and can easily be recovered by known means, such as merely draining.

This latter embodiment of the invention couples two phenomena to provide a useful result: movement of liquids along preferentially wettable surfaces and a low pressure drop across a semipermeability unique membrane, thus separating the wetting liquid, phosphorus, from ultra fine solids and the non-wetting liquid, water. Filtration processes normally depend upon forcing the liquid through a solid medium which has openings smaller than the smallest solid particle to be removed. If these particles are very small, 1 μm in diameter or less, the process becomes too slow. The present invention does not depend upon the size of the opening in the barrier to exclude particulate matter since the width of the openings may be one hundred times the diameter of the particle to be excluded.

It is not necessary for the practice of this invention to understand how a porous, hydrophobic surface wet with phosphorus can prevent the passage of particles through openings having a width of up to one hundred times the diameter of the particles. However, the model supra is useful in describing this and other preferred embodiments of the invention. The model suggests that the sacks or skins surrounding the phosphorus droplets in the sludge rupture on contact with the surface and the phosphorus expressed from the droplets wets the surface of the barrier and coalesces with other droplets, thereby holding the sacks or skins to form a composite membrane with a very high permeability to phosphorus, but effective to exclude small particulate impurities.

The model, therefore, explains that the width of the openings in the barrier has no relationship to the size of the particles excluded by the membrane formed by the sacks or skins over the openings. The maximum width of the openings is, on the other hand, dependent on the size and strength of the sacks or skin coating the droplets in the sludge. Openings as wide as 500 μm can support a membrane when the droplets in the sludge are large, but smaller openings, such as 200 μm or even 150 μm, are preferred for sludge containing small droplets.

The minimum width of the openings is important to optimize the flow of phosphorus through the barrier and minimize the required pressure differential. Openings of at least 50 μm in width are preferred; openings at least 100 μm in width are more preferred.

The operation of the barriers of the present invention is different in operation from the coalescence known in the prior art. Redmon, D. C., in "Cartridge Type Coalescers", *Chemical Engineering Progress*, Volume 59, No. 9, pages 87 to 90, explains that the prior art coalescers permit the passage of both the continuous phase and the discontinous phase. In addition, particulate impurities with diameters smaller than the width of the openings in the coalescers are allowed to pass through, and not, as in the present invention, retained even though their diameters are one-hundredth the width of the openings.

The following non-limiting examples further illustrate preferred embodiments of the invention.

EXAMPLE I

A. A sample of sludge was rolled between polyethylene surfaces. Some sludge particles were deformed and adhered to the polyethylene surface and coalesced into large, adhering drops.

B. One polyethylene funnel was inserted into the top of another so that the outer surface of one rubbed against the inner surface of another. The surfaces were coated with a light coat of grease to increase the hydrophobic character of the surfaces and the assembly was submerged under water in a container. The inner funnel was rotated while sludge was fed into the space between the two funnels. A stream of consolidated phosphorus emerged from the assembly forming a pool of phosphorus on the bottom of the container.

This example demonstrates that phosphorus can be consolidated and recovered from the sludge by contacting the sludge with a hydrophobic surface with sufficient force to wet the surface with phosphorus.

EXAMPLE II

A sample of sludge was "granulated" by dispersing it by high-speed stirring. Ice was then added, while stirring, to freeze the droplets. The frozen sludge was screened through a sieve with 2.00 mm openings. In a series of runs, weighed portions were added to a rod mill, heated to 65° C., and rolled for 10 minutes. The phosphorus was then solidified by cooling and the sludge was again screened through the mesh. The weight of the sludge passing through the screen was recorded as a percent of the sludge originally added to the mill. The percent of sludge also passing through a 0.85 mm mesh was determined in the latter runs. The effect of rolling without rods and with specific hydrophilic and hydrophobic rods is presented as Table I; the ratio of the length to the diameter (L/D) of the rods was not found to be significant, but is included for completeness. A lower percentage of unconsolidated phosphorus indicates a greater degree of consolidation. Runs 1 to 5 were made using a first batch of sludge; Runs 6 and 7 were made using a second batch of sludge.

The percentage of unconsolidated phosphorus, while useful to indicate a difference in degree of consolidation, is not a quantitative measure of the consolidation or coalescence of the droplets. For example, the sludge in Runs 1, 2, 4, and 6 did not appear greatly different (when observed using a microscope) before or after treatment. However, the sludge from the runs with hydrophobic rods had massive consolidations of elemental phosphorus on the rods easily visible to the unaided eye.

EXAMPLE III

A polypropylene screen, having 106 μm openings, was sealed in the bottom of a 2.5 cm section of polypropylene tubing. The assembly was immersed in a 65° C. water bath and the tube was filled with black phosphorus sludge. Drops of clear, clean phosphorus were observed to form on the screen and drop therefrom even though the particulate matter in the phosphorus droplets had diameters of about 1 μm.

EXAMPLE IV

The condition of the hydrophobic surface was found to be critical.

A. Sludge was pumped through commercial polyethylene tubing. Initially, the polyethylene tubing was not wet with phosphorus. After the pumping continued, the surface of the tubing became wet with coalesced droplets of phosphorus indicating the surface had become conditioned, presumably by sweeping away any hydrophilic materials thereon.

B. Granulated sludge was drawn into a tube loaded with rings cut from polyethylene tubing so as to expose freshly cut surfaces to the sludge. When the sludge was expelled, it formed a single pool of consolidated, dirty phosphorus.

C. A subsequent test did not yield a consolidated product when sludge was pumped through a tube containing untreated polyethylene lumps.

EXAMPLE V

A rectangular cell was constructed of clear, plastic sheets so that opposite 2.5×15 cm sides were open. On one side, a polypropylene screen with 105 μm openings covered one side. The other side was similarly covered with a 160 μm mesh stainless steel screen. Outer chambers of transparent plastic were made to support the inner chamber and to separately contain any filtrate from either side. After being almost filled with water, the assembly was partially submerged in a 55° C. water bath. Black phosphorus sludge was added to the inner chamber to a depth of 12 cm. Clean, clear phosphorus emerged from the polypropylene screen side at depths greater than 5 cm, but none emerged from the stainless steel screen side.

EXAMPLE VI

A spiral-wound, polypropylene cartridge filter, 7.6 cm outside diameter by 25 cm in length, was assembled in a chamber which had been piped to permit a radial, inward flow of phosphorus through the cartridge and an external, axial flow of sludge. The assembly was heated with hot water. Sludge was recycled over the outside of the filter cartridge; a low-pressure drop was maintained across the cartridge. About two liters of clean, slightly yellow, solids-free phosphorus were collected.

The apparatus was cooled, disassembled, and the cartridge sawed axially for examination. Only a thin layer on the outer edge of the cartridge showed solids containment and no appreciable build-up of solids had occurred on the surface of the filter.

The core of the cartridge was filled with clean phosphorus; particulate matter remained suspended in the sludge.

TABLE I

Consolidation of Dispersed Sludge In A Rod Mill

| Run | Rods Surface Material | Ratio L/D | % Unconsolidated Phosphorus 0.0–2.00 mm | % Unconsolidated Phosphorus 0.0–0.85 mm |
|---|---|---|---|---|
| 1 | No rods | — | 35.4 | * |
| 2 | Ceramic | 1 | 30.8 | * |
| 3 | Polyethylene | 1 | 17.6 | 6.0 |
| 4 | Aluminum | 7 | 36.3 | 10.4 |
| 5 | Polyethylene | 7 | 17.7 | 6.1 |
| 6 | No rods | — | 30.8 | 18.5 |
| 7 | Rubber | 7 | 14.3 | 0.7 |

*Not determined during initial runs.

What is claimed is:

1. A process for separating phosphorus from a electrothermal phosphorus plant sludge containing phosphorus, water, and an impurity insoluble therein comprising:
    (a) contacting a hydrophobic surface with the sludge under sufficient force that the phosphorus droplets in the sludge wet the hydrophobic surface and coalesce; and
    (b) recovering the coalesced phosphorus.

2. The process of claim 1 wherein the contacting force of step (a) is applied by the kinetic energy of the sludge impacting the hydrophobic surface.

3. The process of claim 1 wherein the contacting force of step (a) is applied by static pressure exerted by the sludge against the hydrophobic surface.

4. The process of claim 1, 2, or 3 wherein the recovering step (b) is draining the coalesced phosphorus from the sludge or insoluble impurity.

5. The process of claim 4 wherein the hydrophobic surface is polyethylene.

6. The process of claim 4 wherein the hydrophobic surface is polypropylene.

7. The process of claim 4 wherein the hydrophobic surface is rubber.

8. The process of claim 1, 2, or 3 wherein the recovering step (b) is by applying a centrifugal force to the coalesced phosphorus and sludge.

9. The process of claim 8 wherein the hydrophobic surface is polyethylene.

10. The process of claim 8 wherein the hydrophobic surface is polypropylene.

11. The process of claim 8 wherein the hydrophobic surface is rubber.

12. A process for separating phosphorus from a electrothermal phosphorus plant sludge containing phosphorus, water and an impurity insoluble therein comprising:
    (a) contacting sludge with the proximal surface of a hydrophobic barrier, said barrier having openings connecting the proximal and distal surfaces thereof;
    (b) applying sufficient force on the sludge whereby the phosphorus in the sludge wets the proximal surface of the barrier, passes through the openings and collects on the distal side of said barrier as a coalesced mass substantially free of impurities, and
    (c) recovering the phosphorus from the distal surface of the barrier.

13. The process of claim 12 wherein the hydrophobic barrier surfaces are polyethylene.

14. The process of claim 12 wherein the hydrophobic barrier surfaces are polypropylene.

15. The process of claim 12 wherein the hydrophobic barrier surfaces are rubber.

16. The process of claim 12, 13, 14, or 15 wherein the width of the openings is between 10 μm and 200 μm.

17. The process of claim 12, 13, 14, or 15 wherein the width of the openings is between 100 μm and 150 μm.

18. A process for separating phosphorus from an electrothermal phosphorus plant sludge containing phosphorus, water, and an impurity insoluble therein comprising:
    (a) contacting the sludge with a first hydrophobic surface rotating against a second hydrophobic surface with sufficient force that the phosphorus droplets in the sludge wet the first and second hydrophobic surfaces and coalesce; and
    (b) recovering the coalesced phosphorus.

19. A process for separating phosphorus from an electrothermal phosphorus plant sludge containing phosphorus, water, and an impurity insoluble therein comprising:
    (a) contacting the sludge with a first hydrophobic surface sliding over a second hydrophobic surface under sufficient force that the phosphorus droplets in the sludge wet the hydrophobic surfaces and coalesce; and
    (b) recovering the coalesced phosphorus.

20. The process of claim 18 or 19 wherein the recovering step (b) is draining the coalesced phosphorus from the sludge or insoluble impurity.

21. The process of claim 20 wherein a hydrophobic surface is polyethylene.

22. The process of claim 20 wherein the hydrophobic surface is polypropylene.

23. The process of claim 20 wherein a hydrophobic surface is rubber.

24. The process of claim 18 or 19 wherein the recovering step (b) is by applying a centrifugal force to the coalesced phosphorus and sludge.

25. The process of claim 24 wherein a hydrophobic surface is polyethylene.

26. The process of claim 24 wherein a hydrophobic surface is polypropylene.

27. The process of claim 24 wherein a hydrophobic surface is rubber.

* * * * *